Patented Nov. 17, 1953

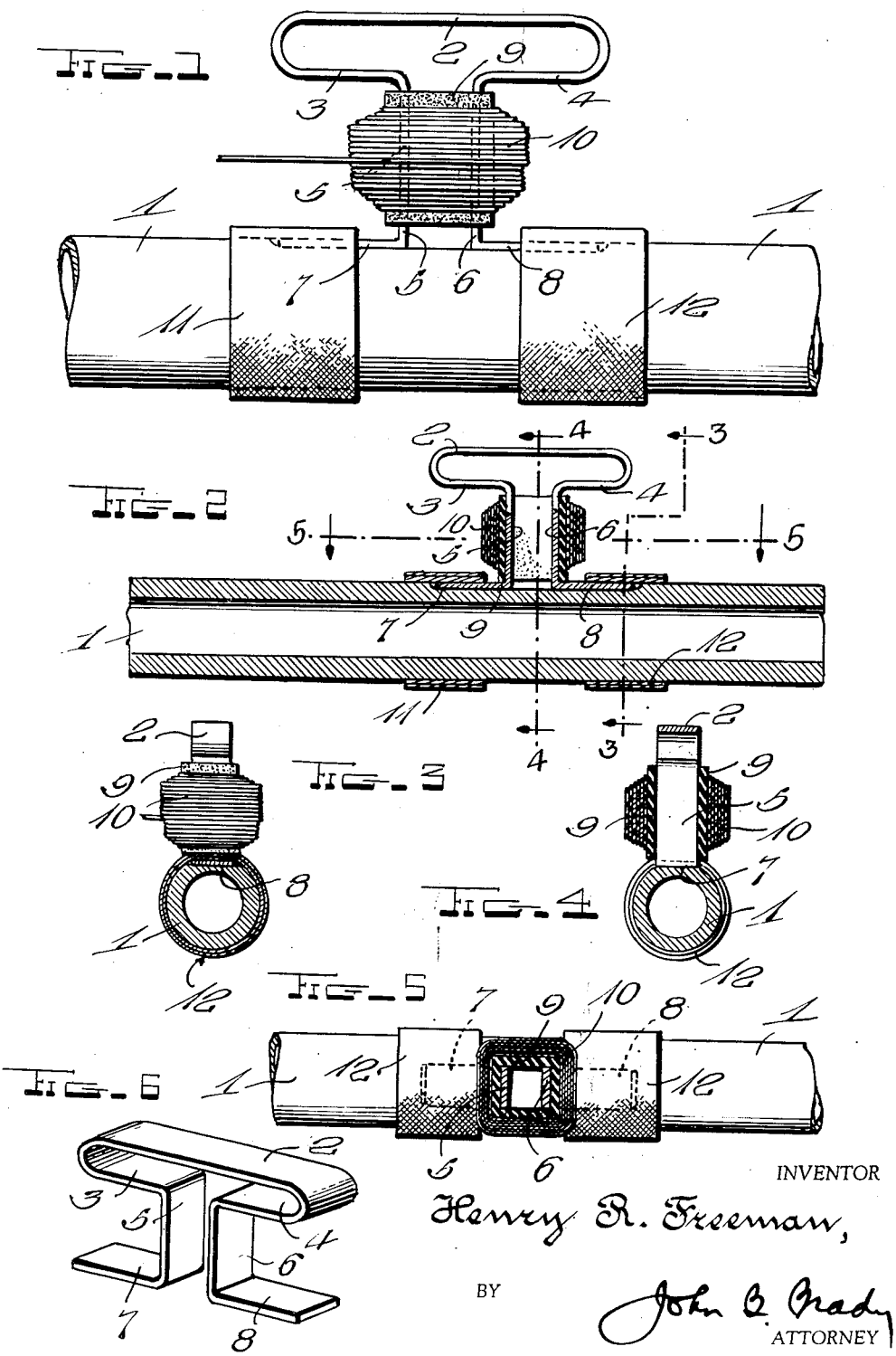

2,659,544

UNITED STATES PATENT OFFICE 2,659,544

ATTACHABLE REEL FOR FISHING RODS

Henry R. Freeman, Shreveport, La.

Application February 13, 1950, Serial No. 143,951

3 Claims. (Cl. 242—84.1)

My invention relates broadly to fishing rods, and more particularly to attachments for improving the convenience and efficiency of use of the ordinary cane type of fishing pole.

One of the objects of my invention is to provide a construction for a set of parts which may be readily applied to the ordinary cane type of fishing pole for facilitating the use of such poles in fishing and eliminating the usual entanglement of the fish line inherent in the use of the ordinary tied line type of fishing pole.

Another object of my invention is to provide a construction of line winding and unwinding member for attachment to fishing poles which facilitates the winding and unwinding of the line near the handgrip of the fishing pole.

Still another object of my invention is to provide a construction of attachment for a fishing pole in the form of a winding spool which is readily fastened to the fishing pole adjacent the handgrip thereof and serves as a means for winding and unwinding or paying out the fishing line, in a manner in which the line is maintained free from all entanglements.

Other and further objects of my invention reside in the construction of winding and unwinding spool as set forth more fully in the specification hereinafter following by reference to the accompanying drawings, in which:

Figure 1 is a side elevational view showing the winding and unwinding attachment of my invention and the manner of attachment to a fishing pole;

Fig. 2 is a longitudinal sectional view of the winding and unwinding attachment;

Fig. 3 is a sectional view taken substantially on line 3—3 of Fig. 2;

Fig. 4 is a transverse sectional view taken substantially on line 4—4 of Fig. 2;

Fig. 5 is a sectional view taken substantially on line 5—5 of Fig. 2; and

Fig. 6 is a perspective view of the winding and unwinding attachment shown in Figs. 1–5.

The attachment means of my invention consists of a construction of winding and unwinding spool that is readily attachable to the ordinary cane type fishing pole to convert such pole into a convenient and efficient aid for fishing.

The customary manner in which a cane fishing pole is rigged for fishing is to tie one end of the line any desired distance from the tip of the pole and then wind it around the pole to the top where it is usually fastened by knotting or looping around the tip of the pole. If the line happens to be too long for the depth one wants to fish, then the line again has to be wound, looped and fastened at the tip of the pole. Should one want to lengthen the line for deeper fishing, again one has to untie and unwind to the right length and go through the process of tying and knotting the line again. If one is fishing from a boat, each time the fisherman has to do this he may splash the butt end of the pole in the water and scare away any fish that might be around. When through fishing the line is usually very carelessly looped and wound around the tip of the pole in a wad of knotted and tangled line, with the hook hanging loose or loosely fastened to something. All this is usually forgotten until the fisherman is ready to go fishing again; then comes the grief of trying to untangle this mass of knotted line and usually ends up in cutting the whole wad off and putting on a new line.

My winding and unwinding attachment eliminates all of the foregoing annoyances in their entirety. The winding spool is attached about 24" from the butt of the pole, within easy reach if depth of the line has to be changed. Several yards of line of the average size may be wound on this spool, and it is never knotted or tangled in any manner. The depth the fisherman wants to fish is simply adjusted by just winding or unwinding the line, as the case may be.

Referring to the drawings in more detail, reference character 1 designates the ordinary cane type of fishing pole the view showing the handgrip end portion. The handgrip end portion of the pole has the winding and unwinding spool of my invention attached about twenty-four inches (24") from the butt of the pole within easy reach, so that the depth of the line may be quickly changed from time to time and the line readily wound in stored position for transportation of the fishing pole.

The winding and unwinding member is integrally formed from a flat strip of material which is looped upon itself at each end thereof forming a looped portion and extended at the central portions thereof in spaced planes normal to the looped portion of the member. The centrally arranged supporting members of the member and the attachment legs are flat in cross-section. In this arrangement the flat strip 2 has looped portions 3 and 4 bent upon themselves, and the centrally arranged connecting members 5 and 6 extending integrally therewith and terminating in the flat oppositely directed attachment legs 7 and 8. The centrally arranged connecting members 5 and 6 support the light waterproof plastic sleeve 9 forming a core over which the fishing line 10 is wound or payed out. The opposite directed attachment legs 7 and 8 which are flat in cross-sectional contour can readily be applied against the flattened portion of the fishing pole 1 and then taped thereto by means of the tough, sticky tape represented at 11 and 12. Thus, the winding and unwinding spool may be adequately supported against the side of the fishing pole 1 irrespective of whether the fishing pole at the position of attachment may be flat, irregular, or curved.

The use of the attachment of my invention provides greater pleasure and convenience for the cane pole fisherman in that it eliminates winding, looping and tying line at the top of the pole; permits adjusting length of line without having to splash one end of the pole in the water if one is fishing from a boat and thus frightening the fish away; permits easier fishing around bushes and low limbs around the bank of the stream; when not in use the line is wound by hand onto the winding spool until most of the line is in, whereupon the entire tackle is ready for safe transportation or storage.

I have found the construction described herein highly practical, useful and efficient. I realize, however, that modifications of my invention may occur to others after consideration of my disclosure herein, and I desire that it be understood that no limitations upon my invention are intended other than may be imposed by the scope of the appended claims.

What I claim as new and desire to secure by Letters Patent of the United States is as follows:

1. A winding and unwinding member for fishing lines attachable to fishing poles comprising an integrally formed flat strip of material which is looped upon itself at each end thereof forming a looped portion and extended at the central portions thereof in spaced planes normal to the looped portion of the member, the ends of said central portions being formed into attachment legs projecting in opposite directions from said central portions, a tubular sleeve carried by the central portions of said strip forming a core around which the fishing line is wound or unwound, and means for fastening said attachment legs to a fishing pole.

2. A winding and unwinding member for fishing lines attachable to fishing poles comprising an integrally formed flat strip of material which is looped upon itself at each end thereof forming a looped portion and extended at the central portions thereof in spaced planes normal to the looped portion of the member, the ends of said central portions being formed into attachment legs projecting in opposite directions from said central portions, and a rectangular sleeve mounted on the spaced central portions of said strip providing a core about which the fishing line is wound or unwound.

3. A winding and unwinding member for fishing lines attachable to fishing poles comprising an integrally formed flat strip of material which is looped upon itself at each end thereof forming a looped portion and extended at the central portions thereof in spaced planes normal to the looped portion of the member, the ends of said central portions being formed into attachment legs projecting in opposite directions from said central portions, and a plastic sleeve mounted on the central portions of said strip and serving as a core for receiving, supporting, and paying out the fishing line.

HENRY R. FREEMAN.

References Cited in the file of this patent

UNITED STATES PATENTS

| Number | Name | Date |
|---|---|---|
| 648,505 | Linbohm | May 1, 1900 |
| 919,778 | Scanlan | Apr. 27, 1909 |
| 1,516,522 | Farr | Nov. 25, 1924 |
| 1,752,866 | Trombetta | Apr. 1, 1930 |
| 1,928,153 | Hess | Sept. 26, 1933 |
| 2,044,073 | Hurley | June 16, 1936 |
| 2,427,801 | McKee | Sept. 23, 1947 |

FOREIGN PATENTS

| Number | Country | Date |
|---|---|---|
| 585,959 | France | Dec. 19, 1924 |